(12) United States Patent
Nakamura et al.

(10) Patent No.: US 11,634,586 B2
(45) Date of Patent: Apr. 25, 2023

(54) GLITTER PIGMENT, PIGMENT-CONTAINING COMPOSITION, AND PIGMENT-CONTAINING PAINTED PRODUCT

(71) Applicant: Nippon Sheet Glass Company, Limited, Tokyo (JP)

(72) Inventors: Koichiro Nakamura, Kanagawa (JP); Masahiro Hioki, Mie (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 90 days.

(21) Appl. No.: 17/245,910

(22) Filed: Apr. 30, 2021

(65) Prior Publication Data

US 2021/0253866 A1    Aug. 19, 2021

Related U.S. Application Data

(63) Continuation of application No. 16/465,024, filed as application No. PCT/JP2017/028500 on Aug. 4, 2017, now Pat. No. 11,028,272.

(30) Foreign Application Priority Data

Dec. 26, 2016 (JP) ................. 2016-250514

(51) Int. Cl.
*C09C 1/00* (2006.01)
*C09D 7/40* (2018.01)
(Continued)

(52) U.S. Cl.
CPC .............. *C09C 1/0051* (2013.01); *C09C 1/28* (2013.01); *C09C 1/40* (2013.01); *C09C 3/06* (2013.01);
(Continued)

(58) Field of Classification Search
None
See application file for complete search history.

(56) References Cited

U.S. PATENT DOCUMENTS 8,500,901 B2    8/2013  Rueger et al.
9,663,661 B2 *  5/2017  Kaupp ................. C03C 3/093
(Continued)

FOREIGN PATENT DOCUMENTS

JP    2001031421    2/2001
JP    2005532467    10/2005
(Continued)

OTHER PUBLICATIONS

International Search Report issued for International Patent Application No. PCT/JP2017/028500, dated Sep. 5, 2017, 5 pages including English translation.
(Continued)

*Primary Examiner* — Tae H Yoon
(74) *Attorney, Agent, or Firm* — Hamre, Schumann, Mueller & Larson, P.C.

(57) ABSTRACT

The present invention provides a new glitter pigment suitable for providing high-brightness whitish reflected light. The glitter pigment according to the present invention includes: a flaky substrate 1; and a silicon oxide layer 2 and a titanium oxide layer 3 formed in this order on the flaky substrate 1, wherein in the case where the flaky substrate is the glass flake, the glass flake has a thickness of 284 to 322 nm, the silicon oxide layer has a thickness of 89 to 109 nm, and the titanium oxide layer has a thickness of 51 to 86 nm. In the case where the flaky substrate is the alumina flake, the alumina flake has a thickness of 260 to 280 nm, the silicon oxide layer has a thickness of 79 to 102 nm, and the titanium oxide layer has a thickness of 47 to 87 nm.

7 Claims, 2 Drawing Sheets

(51) Int. Cl.
*C09D 133/12* (2006.01)
*C09D 169/00* (2006.01)
*C09C 3/06* (2006.01)
*C09C 1/28* (2006.01)
*C09D 17/00* (2006.01)
*C09C 1/40* (2006.01)
*C08K 3/40* (2006.01)
*C08K 7/00* (2006.01)
*C08K 9/02* (2006.01)
*C08K 3/22* (2006.01)

(52) U.S. Cl.
CPC .............. *C09D 7/70* (2018.01); *C09D 17/00* (2013.01); *C09D 133/12* (2013.01); *C09D 169/00* (2013.01); *C01P 2004/62* (2013.01); *C01P 2004/84* (2013.01); *C08K 3/40* (2013.01); *C08K 7/00* (2013.01); *C08K 9/02* (2013.01); *C08K 2003/2227* (2013.01); *C09C 2200/102* (2013.01); *C09C 2200/1004* (2013.01); *C09C 2200/301* (2013.01); *C09C 2200/302* (2013.01); *C09C 2200/303* (2013.01)

(56) References Cited

U.S. PATENT DOCUMENTS

| | | |
|---|---|---|
| 9,834,673 B2 | 12/2017 | Wakita |
| 10,647,861 B2 | 5/2020 | Suzuki et al. |
| 2006/0155007 A1 | 7/2006 | Huber |
| 2006/0225609 A1 | 10/2006 | Rueger et al. |
| 2007/0032573 A1 | 2/2007 | Yanagase et al. |
| 2008/0168924 A1 | 7/2008 | Melson et al. |
| 2009/0056591 A1 | 3/2009 | Schmidt et al. |
| 2009/0320719 A1 | 12/2009 | Lee et al. |
| 2011/0129674 A1 | 6/2011 | Rueger et al. |
| 2014/0322536 A1 | 10/2014 | Suzuki et al. |

FOREIGN PATENT DOCUMENTS

| | | |
|---|---|---|
| JP | 2006510797 | 3/2006 |
| JP | 2009527605 | 7/2009 |
| JP | 2010502774 | 1/2010 |
| JP | 2010208040 | 9/2010 |
| JP | 2011520764 | 7/2011 |
| JP | 2014218425 | 11/2014 |
| WO | 2005028566 | 3/2005 |
| WO | 2006018196 | 2/2006 |

OTHER PUBLICATIONS

Extended European Search Report, issued in the corresponding European patent application No. 17888852.5 dated Sep. 8, 2020, 5 pages.

* cited by examiner

GLITTER PIGMENT, PIGMENT-CONTAINING COMPOSITION, AND PIGMENT-CONTAINING PAINTED PRODUCT

This application is a Continuation of U.S. patent application Ser. No. 16/465,024, filed on May 29, 2019 know U.S. Pat. No. 11,028,272), which is a 371 National Stage Application, which claims the benefit of International Application No. PCT/JP2017/028500, filed on Aug. 4, 2017, which claims priority to Japanese Patent Application No. 2016-250514, filed on Dec. 26, 2016, the contents of which are hereby incorporated by references in their entirety.

TECHNICAL FIELD

The present invention relates to glitter pigments, particularly relates to a glitter pigment including a glass flake or alumina flake as a substrate, and more particularly relates to a glitter pigment capable of providing high-brightness whitish reflected light. The present invention also relates to a composition containing a glitter pigment and to a painted product having a paint film containing a glitter pigment.

BACKGROUND ART

Particles of, for example, titanium oxide, zinc oxide, cerium oxide, calcium carbonate, and barium sulfate are widely used as whitish pigments. Compared to particulate pigments, flaky pigments are advantageous to increase the brightness of reflected light and improve the gloss of the pigments. Since a principal surface of a flaky pigment is oriented in a paint film along a paint film surface, flaky pigments are suitable for improving the brightness of reflected light, particularly, from a paint film. Moreover, cosmetics containing a flaky pigment spread well when used and such cosmetics are suitable for allowing users to experience a smooth texture.

As a flaky whitish pigment, a flake of bismuth oxychloride (BiOCl) is known. A flake of bismuth oxychloride can be obtained by hydrolysis of bismuth trichloride. The reflected light from this whitish pigment has relatively high brightness. Patent Literature 1 proposes addition of an anti-ultraviolet stabilizer such as an organic ultraviolet absorber to a pigment to improve insufficient light resistance of bismuth oxychloride.

However, an additive incorporated to improve the light resistance of bismuth oxychloride causes a further increase in production cost of pigments. A flaky whitish pigment composed not of an oxychloride but of a stable compound, typified by an oxide needs no additives for the improvement in light resistance.

Patent Literature 2 discloses a whitish pigment produced by forming a silicon oxide layer and titanium oxide layer in this order on a glass flake. According to Examples 1 to 8 of Patent Literature 2, the L* value, which is a measure of the brightness of reflected light, is in the range of 73 to 76 (Table 2). The reflected light of Examples 1 to 8 is a whitish light having a chroma C* value in the range of 2.16 to 3.6. Examples 1 to 8 of Patent Literature 2 describes that the average thickness of the glass flake is 700 nm, that the thickness of the silicon oxide layer is 7 to 70 nm, and additionally that the L* value reaches the highest value when the silicon oxide layer has a thickness of 70 nm (Examples 1 and 2 on Table 3). The thickness of the titanium oxide layer is not disclosed specifically.

CITATION LIST

Patent Literature

Patent Literature 1: JP 2005-532467 A
Patent Literature 2: JP 2006-510797 A

SUMMARY OF INVENTION

Technical Problem

For the titanium oxide layers in Examples 1 and 2 of Patent Literature 2, the thickness at which the brightness of the resultant reflected light is maximized can be calculated by optical simulation. According to the optical simulation described later in detail, the titanium oxide layer has a thickness of about 70 to 80 nm when the L* value is maximum. The maximum L* value is about 67 when the pigment is surrounded by air, and the maximum L* value is about 49 when the pigment is surrounded by a resin (polymethylmethacrylate (PMMA)) (refer to Tables 7 and 9 of the present invention). The L* value of reflected light actually measured in Patent Literature 2 is 76, which is beyond the L* value obtained by the calculation. The differences in L* values result from the fact that reflected light from one piece of the pigment is calculated in the optical simulation, while reflected light from a plurality of pigment pieces overlapping in the thickness direction is observed in the case of a coating card (refer to Examples of Patent Literature 2) including the flaky whitish pigment dispersed (refer to Table 9 of the present invention).

To further increase the brightness of reflected light, it is conceivable to increase the number of layers of an optical interference system composed of two layers, i.e., the titanium oxide layer which is a high refractive index layer and the silicon oxide layer which is a low refractive index layer. Patent Literature 2 also suggests this method (in Paragraph 0032). However, the increase of the number of layers causes an increase in production cost and thickness of the resultant pigment.

Therefore, the present invention aims to provide a new glitter pigment suitable for providing high-brightness whitish reflected light without increasing the number of layers.

Solution to Problem

A study by the present inventors has revealed that the brightness of whitish reflected light can be further improved by using a flaky substrate such as a glass flake as a layer for forming an optical interference system in addition to a silicon oxide layer and titanium oxide layer. That is, in the present invention, a flaky substrate is used not only as a substrate on which a layer is formed, but also as a part of an optical interference system.

The present invention provides a glitter pigment, including:
a flaky substrate; and
a silicon oxide layer and a titanium oxide layer formed in this order on the flaky substrate, wherein
the silicon oxide layer and the titanium oxide layer are formed on both a first principal surface and a second principal surface of the flaky substrate, the first principal surface and the second principal surface being opposite to each other,
the flaky substrate is a glass flake or an alumina flake,
a) in the case where the flaky substrate is the glass flake,
the glass flake has a thickness of 284 nm or more and 322 nm or less, the silicon oxide layer has a thickness of 89 nm or more and 109 nm or less, and the titanium oxide layer has a thickness of 51 nm or more and 86 nm or less, b) in the case where the flaky substrate is the alumina flake, the alumina flake has a thickness of 260 nm or more and 280 nm or less, the silicon oxide layer has a thickness of 79 nm or more and 102 nm or less, and the titanium oxide layer has a thickness of 47 nm or more and 87 nm or less, and whitish reflected light is produced by a five-layer optical interference system composed of the titanium oxide layer, the silicon oxide layer, the flaky substrate, the silicon oxide layer, and the titanium oxide layer which are arranged in this order along a thickness direction of the flaky substrate.

The term "optical interference system" as used herein refers to a layer unit formed by continuously stacking, in the thickness direction, layers having an optical thickness of 780 nm, which is the upper end of the visible wavelength range, or less. However, a thin layer having a thickness of 25 nm or less, particularly a very thin layer having a thickness of 15 nm or less, and a small matter attaching like an island and not forming a layer are not counted as a layer for forming the optical interference system because of their very limited optical influence. Thus, even when a thin layer having a thickness of the above-described upper end value or less intervenes between the layers of the above optical interference system, the optical interference system remains to have a five-layer structure. Generally, the more the number of layers composing the optical interference system increases, the more flexible the optical design becomes for controlling the transmission in the visible range or the reflectance properties.

Additionally, the term "whitish" as used herein refers to being a color whose absolute values of a* and b* are both 30 or less, preferably 25 or less, more preferably 20 or less, and particularly preferably 15 or less, in the L*a*b* color system. The term "thickness" refers to the physical thickness instead of the optical thickness, unless otherwise specified.

Advantageous Effects of Invention

The present invention provides a whitish glitter pigment including an oxide with excellent light resistance and suitable for providing high-brightness reflected light. The thickness of each layer of the five-layer optical interference system according to the present invention is adjusted so that high-brightness reflected light is produced not only when the five-layer optical interference system exists alone as a product, i.e., when the five-layer optical interference system is surrounded by air, but also when the five-layer optical interference system is dispersed in a typical resin.

DESCRIPTION OF EMBODIMENTS

Hereinafter, the present invention will be described in detail. The following description is not intended to limit the present invention to specific embodiments.

[Structure of Layers of Glitter Pigment]

Figure 1:
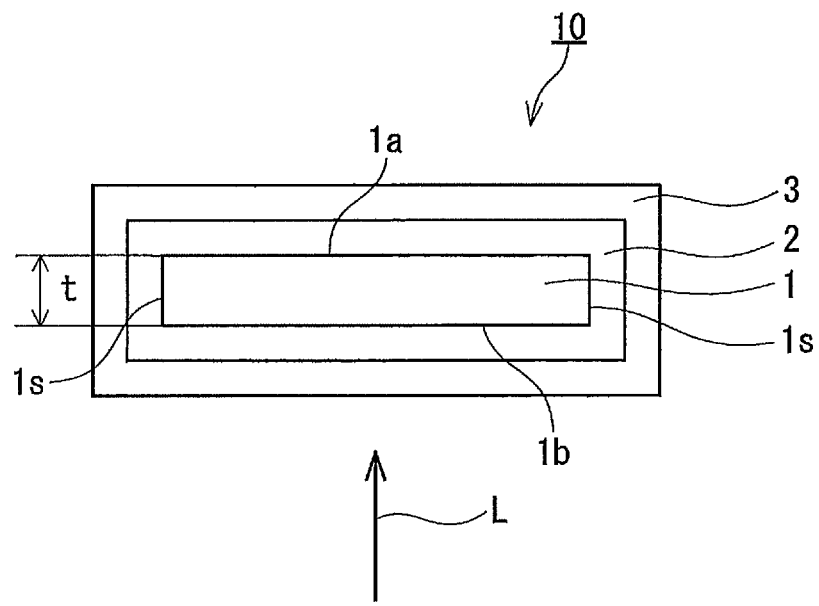
FIG. 1 is a cross-sectional view illustrating the structure of a glitter pigment according to an embodiment of the present invention.

In the embodiment shown in FIG. 1, a glitter pigment 10 includes: a flaky substrate 1; and a silicon oxide layer 2 and a titanium oxide layer 3 formed in this order on the flaky substrate 1. More specifically, the silicon oxide layer 2 and the titanium oxide layer 3 are formed on both a first principal surface 1a and a second principal surface 1b of the flaky substrate 1, the first principal surface 1a and the second principal surface 1b being opposite to each other, and also formed on a side surface 1s. In other words, an oxide film composed of the silicon oxide layer 2 and titanium oxide layer 3 covers the entire flaky substrate 1. The titanium oxide layer 3 is the outermost layer of the oxide film covering the flaky substrate 1 and has contact with the external atmosphere, typically, air. On the titanium oxide layer 3, however, the glitter pigment 10 may have an additional layer having an optical thickness beyond the visible wavelengths. The additional layer is, for example, a protective layer. The first principal surface 1a and second principal surface 1b are a pair of surfaces substantially parallel to each other, and the distance therebetween corresponds to the thickness t of the flaky substrate 1.

Figure 2:
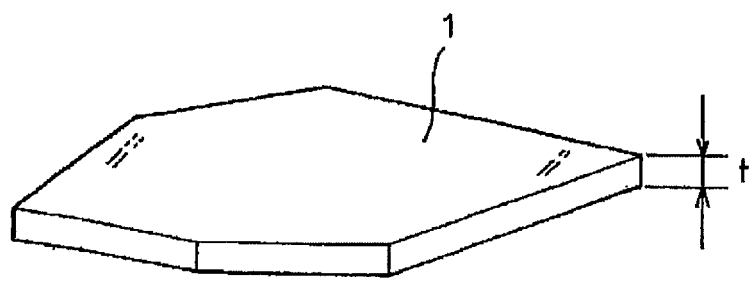
FIG. 2 is a perspective view illustrating a flaky substrate according to an embodiment.

FIG. 2 shows a typical shape of the flaky substrate 1. As shown in FIG. 2, the flaky substrate 1 is, for example, a scale-like thin piece.

The glitter pigment 10 has the titanium oxide layer 3, silicon oxide layer 2, flaky substrate 1, silicon oxide layer 2, and titanium oxide layer 3 as an optical interference system along the direction of the thickness t of the flaky substrate 1. The flaky substrate 1 is a glass flake or alumina flake.

In the case where the flaky substrate is the glass flake, the thickness of each layer of the optical interference system is adjusted as follows. In the round brackets are the ranges suitable for making the absolute values of a* and b* of reflected light smaller and the L* value of reflected light greater.

Glass flake: 284 to 322 nm (294 to 314 nm)
Silicon oxide layer: 89 to 109 nm (92 to 102 nm)
Titanium oxide layer: 51 to 86 nm (56 to 76 nm)

It is recommended that the thickness of each layer of the glitter pigment to be dispersed in a resin be adjusted depending on the type of resin. When the resin is, for example, PMMA (polymethylmethacrylate) or polycarbonate, the preferable thickness ranges are as follows.

(PMMA)
Glass flake: 287 to 312 nm
Silicon oxide layer: 94 to 109 nm
Titanium oxide layer: 52 to 86 nm
(Polycarbonate)
Glass flake: 286 to 306 nm
Silicon oxide layer: 94 to 104 nm
Titanium oxide layer: 56.5 to 86 nm
The two ranges defined for each layer overlap as follows.
Glass flake: 287 to 306 nm
Silicon oxide layer: 94 to 104 nm
Titanium oxide layer: 56.5 to 86 nm In the case where the flaky substrate is the alumina flake, the thickness (physical thickness) of each layer of the optical interference system is adjusted as follows. In the round brackets are the ranges suitable for making the absolute values of a* and b* of reflected light smaller and the L* value of reflected light greater.

Alumina flake: 260 to 280 nm (265 to 280 nm)
Silicon oxide layer: 79 to 102 nm (83 to 98 nm)
Titanium oxide layer: 47 to 87 nm (51.5 to 71.5 nm)

In the case of the alumina flake as well, it is recommended that the thickness of each layer of the glitter pigment to be dispersed in a transparent resin be adjusted depending on the type of transparent resin. When the transparent resin is PMMA or polycarbonate, the preferable thickness ranges are as follows.

(PMMA)
Alumina flake: 260 to 275 nm
Silicon oxide layer: 79 to 102 nm
Titanium oxide layer: 47 to 84 nm (Polycarbonate)
Alumina flake: 260 to 278 nm
Silicon oxide layer: 79 to 97 nm
Titanium oxide layer: 47 to 82 nm The two ranges defined for each layer overlap as follows.
Alumina flake: 260 to 275 nm
Silicon oxide layer: 79 to 97 nm
Titanium oxide layer: 47 to 82 nm It should be noted that the thickness of each layer is not limited to the above, and can be adjusted so that both of the absolute values of a* and b* of reflected light will be a predetermined value or less, namely, 30 or less, for example, 15 or less.

A conventional pigment causing whitish reflected light is composed of a substrate alone or has a structure including two optical interference systems respectively arranged on opposite sides of a flaky pigment (refer to Examples 1 to 8 of Patent Literature 2). Meanwhile, in the glitter pigment 10, the layers 2 and 3 forming a two-layer film and the flaky substrate 1 form a five-layer optical interference system as a whole. Because of reflection from each layer of this five-layer optical interference system, the glitter pigment 10 provides whitish reflected light. More specifically, light L incident on the first principal surface 1a or second principal surface 1b from a substantially vertical direction produces whitish reflected light (whose absolute values of a* and b* in L*a*b* color system are both 30 or less, as described previously). Although the number of layers formed is two, the five-layer optical interference system can be used. The glitter pigment 10, therefore, is more advantageous for producing high-bright whitish reflected light in terms of optical design than a pigment including a two-layer optical interference system on each surface of its substrate.

According to optical simulation, the glitter pigment according to the present embodiment having the five-layer optical interference system, in which, for example, the silicon oxide layer having a thickness of 97 nm and titanium oxide layer having a thickness of 65.9 nm are sequentially arranged to cover the surfaces of the glass flake having a thickness of 300 nm, produces a whitish reflected light (a*: −4; b*: 6) having an L* value of 74 (when surrounded by air; the same applies to the present and next paragraphs). When the above thicknesses of the silicon oxide layer and titanium oxide layer are maintained and the thickness of the glass flake is increased beyond the above suitable range (284 to 322 nm), the resultant pigment can also produce a whitish reflected light, whose L* value is less than 74. Generally, when the optical thickness of the glass flake is sufficiently greater than the visible wavelengths, the brightness and color of the resultant reflected light is less likely to be affected by a change in thickness of the glass flake. For example, when the silicon oxide layer and titanium oxide layer have the above thicknesses and the glass flake has a thickness in the range of 1000 nm to 5000 nm, the resultant pigment produces a whitish reflected light having a brightness value within a narrow range, namely, 61 to 67. Just by increasing the thickness of the glass flake alone from 300 nm to 400 nm and keeping the above thicknesses of the silicon oxide layer and titanium oxide layer, the L* value of the reflected light of the resultant glitter pigment decreases from 74 to 63. Moreover, just by decreasing the thickness of the glass flake alone from 300 nm to 200 nm, the L* value of the reflected light of the resultant glitter pigment decreases from 74 to 55, and the reflected light is colored and not whitish. When the flaky substrate is so thin that the optical thickness thereof is within the range corresponding to wavelengths in or below the visible range, a change in thickness of the flaky substrate causes a great change in brightness and color of the resultant reflected light. However, proper control of the thickness of each layer of the structure, namely, the five-layer optical interference system, including such a thin flaky substrate can increase the brightness of a whitish reflected light.

The physical thickness of a glass flake having an optical thickness of 780 nm, which is the upper end of the visible wavelength range, or less is about 500 nm or less. The physical thickness of an alumina flake having an optical thickness of 780 nm or less is about 450 nm or less. General-purpose flaky substrates have a thickness of 500 nm or more. Glass flakes and alumina flakes having a thickness of about less than 500 nm are also known. However, an optical interference system including a thin flaky substrate is conventionally used to obtain colored reflected light instead of whitish reflected light.

In Examples 21 and 22 of Patent Literature 2, for example, silicon oxide layers are formed on a glass flake having an average thickness of 500 nm. The silicon oxide layers are 10% with respect to the glass, i.e., each of the silicon oxide layers has a thickness of 25 nm (the total thickness of the silicon oxide layers each arranged on either principal surface of the glass is 50 nm). An iron oxide layer (Example 21) or titanium oxide layer (Example 22) is formed on each of the silicon oxide layers. An iron oxide red pigment is obtained in Example 21, and a pigment presenting a bright interference color having a predetermined hue angle, namely, a pigment presenting colored light is obtained in Example 22. It is also confirmed in Example 11 of Patent Literature 2 that "higher chroma (tinting strength)" is achieved with the use of an about 200-nm-thick alumina flake. As is apparent from these Examples, basically an optical interference system employing about five- or more-layer laminate structure has conventionally been designed to provide a reflected light having a great chroma C* value, namely, colored reflected light. On the other hand, the optical interference system according to the present embodiment provides a whitish reflected light having a small chroma C* value.

From the amount of the raw materials used, the thickness of the silicon oxide layer of Example 22 of Patent Literature 2 is calculated to be about 35 to 45 nm. Even if the thickness of the titanium oxide layer was optimized to obtain whitish reflected light in Example 22, the brightness of the whitish reflected light would not be increased sufficiently (according to the optical simulation, a pigment in which the titanium oxide layer has a thickness of about 60 to 70 nm and which is surrounded by air produces a reflected light having an L* value of only 58 or so). In Example 22, the maximum L* value obtainable by adjusting the thickness of the titanium oxide layer is achieved by a colored reflected light (a slightly yellowish green reflected light having an L* value of about 62 to 65 can be obtained when the thickness of the titanium oxide layer is 90 nm).

With the use of the five-layer optical interference system according to the present embodiment, the L* value of the whitish reflected light from the pigment in the L*a*b* color system, as calculated by the optical simulation, can be increased to, for example, 68 or more, preferably 70 or more, more preferably 71 or more, even more preferably 72 or more, and particularly preferably 73 or more. This L* value is of a reflected light from one piece of the pigment. An actual paint film containing a plurality of pieces of the pigment reflecting light, for example, may produce a reflected light whose L* value is greater than the above values and is, for example, 80 or more, even 82 or more, and particularly about 85 or more. The L* value described in this paragraph refers to a value obtained when the glitter pigment exists alone, in other words, when the glitter pigment is not surrounded by a solid or liquid matrix of a paint film or the like and the surrounding atmosphere is air.

With the use of the five-layer optical interference system according to the present embodiment, the reflectance R of one piece of the pigment at a wavelength of 550 nm, as calculated by the optical simulation, can be increased to 40% or more, even 42% or more, particularly 44% or more, and in some cases 46% or more. Here, the "wavelength of 550 nm" is selected as a wavelength at which the visual sensitivity is high. This paragraph describes the reflectance R obtained also when the glitter pigment exists alone, in other words, when the glitter pigment is not surrounded by a matrix of a paint film or the like and the surrounding atmosphere is air.

The thickness of each layer of the five-layer optical interference system according to the present embodiment is designed in consideration of not only the case where the surrounding atmosphere is air but also the case where the surrounding is a resin, namely, the case where the optical interference system is dispersed in a paint film. The five-layer optical interference system according to the present embodiment, therefore, has great versatility.

[Flaky Substrate]

The flaky substrate is a glass flake or alumina flake. These flaky substrates are mass-produced and thus easily available, and composed of an oxide material which is stable.

(Glass Flake)

The glass flake is a fine, plate-like glass substrate which can be called, for example, a scaly glass particle. The glass composition for forming the glass flake is not particularly limited. A glass composition containing silicon dioxide as a main component and further containing other metal oxides such as aluminum oxide, calcium oxide, and sodium oxide is typically used. The term "main component" is used herein to refer to a component whose content is highest in terms of mass. Examples of glass compositions that can be used include soda-lime glass, A-glass, C-glass, E-glass, borosilicate glass, and aluminosilicate glass. The refractive indices of these glass compositions, which have the same main component (silicon dioxide), are roughly in the range of 1.50 to 1.60, albeit differing slightly. As the glass composition, soda-lime glass, C-glass, E-glass, and borosilicate glass are preferred, and the refractive indices thereof are in the range of 1.52 to 1.58.

The glass flake preferably has an average particle diameter of 1 to 1000 μm, even 3 to 500 μm, and particularly 5 to 200 μm. The average particle diameter of the glass flake is determined as a particle diameter (D50) at 50% by volume in a cumulative undersize distribution of light scattering-based particle sizes measured by laser diffractometry.

General-purpose products of glass flakes have a thickness of about 0.4 to 5 μm. However, to obtain high-bright whitish reflected light by the combination with the laminate film composed of the silicon oxide layer and titanium oxide layer, the thickness of the glass flake is set in the very narrow range (284 to 322 nm) described above. Glass flakes having a thickness in this range can be produced by a conventionally known method, for example, a blow process and rotary process.

Figure 3:
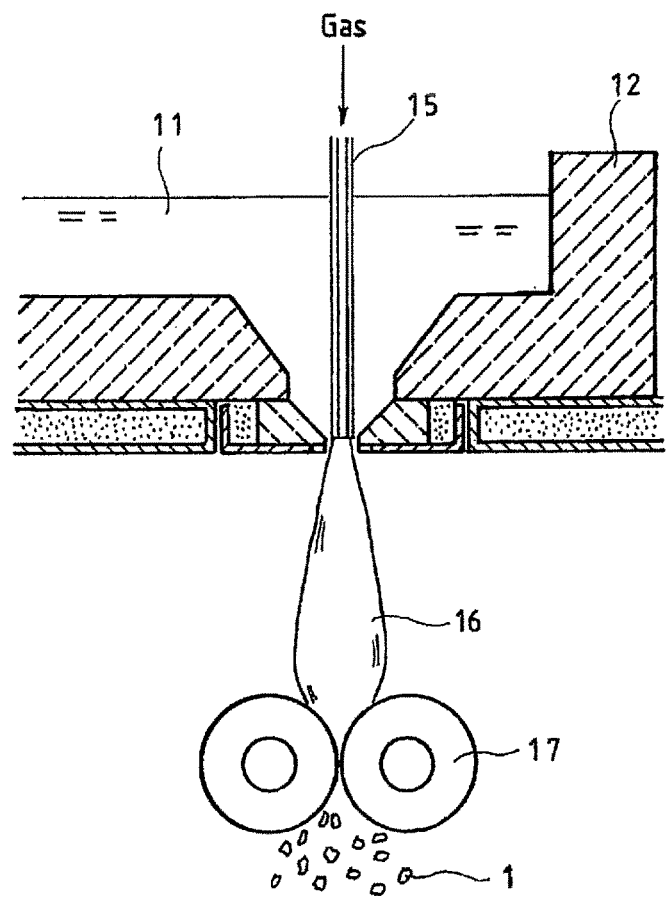
FIG. 3 is a schematic diagram illustrating an exemplary apparatus for producing glass flakes.

FIG. 3 shows an example of an apparatus for producing glass flakes by the blow process. The production apparatus is equipped with a refractory tank furnace 12, blowing nozzle 15, and pressing rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressing rolls 17 to obtain a glass flake 1. The thickness of the glass flake 1 can be controlled by adjusting, for example, the speed of pulling the hollow glass 16 and flow rate of the gas delivered through the blowing nozzle 15.

Figure 4:
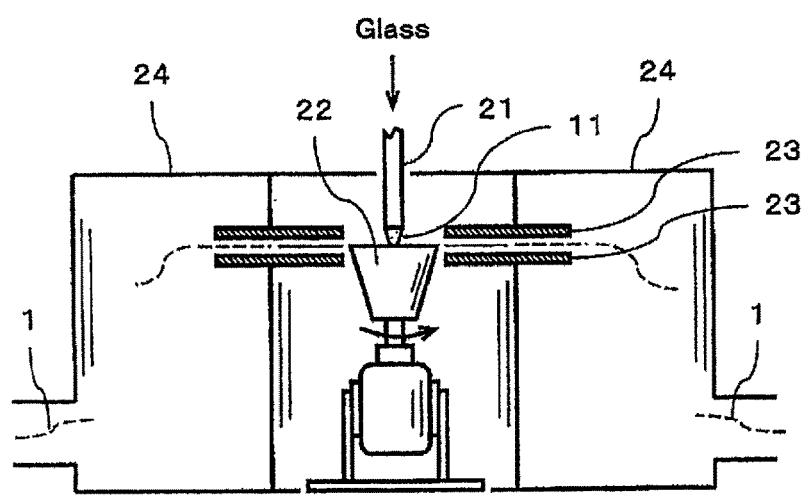
FIG. 4 is a schematic diagram illustrating another exemplary apparatus for producing glass flakes.

FIG. 4 shows an example of an apparatus for producing glass flakes by the rotary process. The apparatus is equipped with a rotary cup 22, pair of annular plates 23, and annular cyclone collector 24. A molten glass raw material 11 is poured into the rotary cup 22, centrifugally flows out from the upper edge of the rotary cup 22 in a radial manner, and is then drawn and carried into the annular cyclone collector 24 through the gap between the annular plates 23 by airflow. While passing through the annular plates 23, the glass is cooled and solidified into a thin film, which is then crushed into fine pieces to give a glass flake 1. The thickness of the glass flake 1 can be controlled by adjusting, for example, the distance between the annular plates 23 and velocity of the airflow.

(Alumina Flake)

The alumina flake is a general-purpose flaky substrate just as the glass flake. Alumina composing the alumina flake is preferably α-alumina (refractive index: 1.76).

The alumina flake preferably has an average particle diameter of 1 to 1000 μm, even 3 to 500 μm, particularly 5 to 200 μm, and more particularly 10 to 100 μm. The average particle diameter of the alumina flake is determined as a particle diameter (D50) as is the case for the average particle diameter of the glass flake.

Alumina flakes commonly have a thickness of about 1 μm or less, and a general-purpose product having a thickness of about 0.8 μm is also commercially-available. However, to obtain high-bright whitish reflected light by the combination with the laminate film composed of the silicon oxide layer and titanium oxide layer, the thickness of the alumina flake is set in the very narrow range (260 to 280 nm). The alumina flake can be produced by a conventionally known method, for example, a method in which an alkali such as sodium hydroxide or sodium carbonate and a phosphorus compound such as a phosphoric acid or phosphoric acid salt are added to an aqueous solution containing an aluminum salt dissolved to obtain a precipitate containing aluminum hydroxide and the precipitate is heat-treated as appropriate. Specifically, this method may include the following steps.

i) A step of adding an alkali to an aqueous solution containing an aluminum salt dissolved or a slurry containing an aluminum salt to form a precipitate containing aluminum hydroxide.

ii) A step of adding a phosphorus compound and, if necessary, a dopant to the aqueous solution, slurry, or precipitate before or after the step i) or during the formation of the precipitate in the step i).

iii) A step of drying the precipitate after the steps i) and ii) to obtain a dry matter.

iv) A step of subjecting the dry matter to heat treatment, for example, at 900 to 1400° C. for 0.5 to 10 hours to obtain an alumina flake in a molten salt.

v) A step of removing a water-soluble part of the product of the heat treatment, for example, by washing with water.

vi) A step of adjusting the average particle diameter and thickness of the alumina flake by appropriately combining, for example, sieving, crushing, and sedimentation.

Examples of the dopant include titanium oxide, zirconium oxide, and silicon oxide. The amount of the dopant added is preferably as small as about 0.05 to 3 weight % with respect to the alumina flake.

The thickness of the alumina flake can be controlled in the above exemplary method by appropriately adjusting, for example, the concentrations of the compounds such as the aluminum salt, alkali, and phosphorus compound and heat treatment conditions such as the heat treatment temperature. In addition to that, appropriate conditions are set in the step vi) to obtain the alumina flake having a thickness controlled in the desired range.

[Laminate Film Composed of Silicon Oxide Layer and Titanium Oxide Layer]

The silicon oxide layer and titanium oxide layer are arranged in this order on the flaky substrate. Each of these layers is formed to have the above thickness depending on the type of substrate. There is already an established technique for forming these layers, and these layers are easily formed to have the desired thicknesses.

The silicon oxide layer can be formed by a method including, for example, a deposition step, such as deposition from sodium silicate (liquid glass) or deposition by hydrolysis of tetraalkoxysilane, and a subsequent thermal condensation step. The detail of this method is disclosed, for example, in Patent Literature 2.

The titanium oxide layer is preferably composed of rutile-type titanium oxide. The anatase type is also known as a crystalline form of titanium oxide. However, anatase-type titanium oxide is highly active as a photocatalyst and may decompose a surrounding organic substance. For the titanium oxide layer for forming the optical interference unit, rutile-type titanium oxide having a high refractive index and being in a relatively stable crystalline form is suitable.

The rutile-type titanium oxide layer can be formed by heating anatase-type titanium oxide to a temperature as high as about 800° C. for transformation to rutile-type titanium oxide. Alternatively, the rutile-type titanium oxide layer can be formed, with no need for high-temperature heating, by attaching a tin compound to a surface where the titanium oxide layer is to be formed to deposit titanium oxide. The detail of the latter method is disclosed, for example, in Patent Literature 2 and JP 2001-031421 A.

[Pigment-Containing Composition and Pigment-Containing Painted Product]

The glitter pigment according to the present invention exhibits a vivid whitish color when incorporated in various compositions. In another aspect, the present invention provides a pigment-containing composition containing the glitter pigment according to the present invention. An example of the pigment-containing composition is at least one selected from a paint, ink, cosmetic, and resin composition. Examples of the resin composition include those containing a resin which is PMMA and/or polycarbonate in addition to the glitter pigment. The resin composition may be a molded product of artificial marble.

In still another aspect, the present invention provides a pigment-containing painted product including a substrate material and a paint film formed on the substrate material, the paint film containing the glitter pigment according to the present invention. The pigment-containing painted product may be painted paper. In this case, the substrate material is paper. The substrate material is not limited to paper, and may be a metal, resin, ceramic, or another material. The paint film may be composed of the pigment-containing composition according to the present invention or may be formed by applying the pigment-containing composition according to the present invention onto the substrate material.

[Optical Simulation]

The relationship between the thickness of the substrate and layers and the reflectance properties was calculated for pigments each including a silicon oxide layer and titanium oxide layer formed in this order on a flaky substrate to form an optical interference system together with the flaky substrate. As is well known, the optical properties including the reflectance properties can be calculated based on the straightness of light, the law of reflection, and the law of refraction (Snell's law) from the refractive indices (n) and extinction coefficients (k), at a certain wavelength, of the materials of the laminate structure (flaky substrate and layers) and the thicknesses of the flaky substrate and layers. It is well known that the reflectance properties calculated by means of the theory of geometrical optics well correspond to the properties of an actual product.

A model of the structure used for the calculation is the surrounding (external environment)/$TiO_2$/$SiO_2$/the flaky substrate (glass flake or alumina flake)/$SiO_2$/$TiO_2$/the surrounding (external environment). It was assumed that the glass flake was made of soda-lime glass and the alumina flake was made of α-alumina. The titanium oxide layer was assumed to be made of rutile-type titanium oxide. The surrounding was assumed to air (refractive index: 1.0) or a resin. It was assumed that the resin was a typical transparent resin, polymethylmethacrylate (PMMA; refractive index: 1.49) or polycarbonate (refractive index: 1.59). It was assumed that the light source was illuminant D65, the incident angle of light was 5°, and the location of measurement of reflected light was in a direction of a reflection angle of 5°. The following tables show the results for the calculation of the reflectance properties. R refers to the reflectance (%) at a wavelength of 550 nm, and the values of L*, a*, and b* are based on the L*a*b* color system. Tables 1 to 3 also show the results for calculation using flakes of bismuth oxychloride.

TABLE 1

Substrate: glass; surrounding: air

| Substrate | Thickness (nm) | | | Reflectance properties | | | |
|---|---|---|---|---|---|---|---|
| | Flake | $SiO_2$ | $TiO_2$ | R (%) | L* | a* | b* |
| BiOCl | 100 | 0 | 0 | 24 | 56 | −4 | 39 |
| BiOCl | 200 | 0 | 0 | 26 | 58 | −31 | 12 |
| BiOCl | 300 | 0 | 0 | 10 | 37 | 8 | −35 |
| Glass | 274.0 | 97.0 | 65.9 | 46 | 74 | −45 | 26 |
| Glass | 284.0 | 97.0 | 65.9 | 47 | 74 | −29 | 19 |
| Glass | 294.0 | 97.0 | 65.9 | 47 | 74 | −13 | 11 |
| Glass | 304.0 | 97.0 | 65.9 | 46 | 74 | 0 | 3 |
| Glass | 314.0 | 97.0 | 65.9 | 44 | 72 | 14 | −5 |
| Glass | 324.0 | 97.0 | 65.9 | 41 | 70 | 26 | −11 |

TABLE 1-continued

Substrate: glass; surrounding: air

| Substrate | Thickness (nm) | | | Reflectance properties | | | |
|---|---|---|---|---|---|---|---|
| | Flake | SiO₂ | TiO₂ | R (%) | L* | a* | b* |
| Glass | 334.0 | 97.0 | 65.9 | 38 | 68 | 34 | −16 |
| Glass | 344.0 | 97.0 | 65.9 | 35 | 66 | 38 | −19 |
| Glass | 354.0 | 97.0 | 65.9 | 32 | 63 | 38 | −19 |
| Glass | 304.0 | 77.0 | 65.9 | 44 | 72 | −49 | 22 |
| Glass | 304.0 | 87.0 | 65.9 | 47 | 74 | −23 | 14 |
| Glass | 304.0 | 92.0 | 65.9 | 47 | 74 | −10 | 8 |
| Glass | 304.0 | 94.5 | 65.9 | 47 | 74 | −4 | 6 |
| Glass | 304.0 | 99.5 | 65.9 | 46 | 78 | −7 | 0 |
| Glass | 304.0 | 102.0 | 65.9 | 44 | 73 | 12 | −2 |
| Glass | 304.0 | 107.0 | 65.9 | 43 | 71 | 21 | −6 |
| Glass | 304.0 | 112.0 | 65.9 | 40 | 70 | 29 | −10 |
| Glass | 304.0 | 117.0 | 65.9 | 37 | 68 | 34 | −11 |
| Glass | 304.0 | 97.0 | 45.9 | 38 | 68 | −41 | 12 |
| Glass | 304.0 | 97.0 | 50.9 | 42 | 71 | −30 | 10 |
| Glass | 304.0 | 97.0 | 55.9 | 44 | 72 | −18 | 7 |
| Glass | 304.0 | 97.0 | 60.9 | 46 | 73 | −8 | 5 |
| Glass | 304.0 | 97.0 | 63.4 | 46 | 74 | −3 | 4 |
| Glass | 304.0 | 97.0 | 68.4 | 46 | 73 | 6 | 2 |
| Glass | 304.0 | 97.0 | 70.9 | 45 | 73 | 10 | 2 |
| Glass | 304.0 | 97.0 | 75.9 | 44 | 72 | 17 | 2 |
| Glass | 304.0 | 97.0 | 80.9 | 41 | 70 | 23 | 4 |
| Glass | 304.0 | 97.0 | 85.9 | 38 | 68 | 27 | 9 |
| Glass | 304.0 | 97.0 | 90.9 | 34 | 65 | 31 | 15 |

TABLE 2

Substrate: glass; surrounding: PMMA

| Substrate | Thickness (nm) | | | Reflectance properties | | | |
|---|---|---|---|---|---|---|---|
| | Flake | SiO₂ | TiO₂ | R(%) | L* | a* | b* |
| BiOCl | 100 | 0 | 0 | 4 | 23 | −3 | 21 |
| BiOCl | 200 | 0 | 0 | 5 | 25 | −21 | 5 |
| BiOCl | 300 | 0 | 0 | 2 | 13 | 6 | −25 |
| Glass | 277.0 | 99.0 | 67.1 | 25 | 57 | −31 | 27 |
| Glass | 282.0 | 99.0 | 67.1 | 25 | 57 | −23 | 23 |
| Glass | 287.0 | 99.0 | 67.1 | 25 | 57 | −16 | 19 |
| Glass | 292.0 | 99.0 | 67.1 | 24 | 56 | −8 | 14 |
| Glass | 297.0 | 99.0 | 67.1 | 24 | 56 | −1 | 9 |
| Glass | 302.0 | 99.0 | 67.1 | 23 | 55 | 6 | 4 |
| Glass | 307.0 | 99.0 | 67.1 | 22 | 54 | 13 | −1 |
| Glass | 312.0 | 99.0 | 67.1 | 21 | 53 | 19 | −6 |
| Glass | 317.0 | 99.0 | 67.1 | 20 | 52 | 24 | −10 |
| Glass | 322.0 | 99.0 | 67.1 | 19 | 51 | 29 | −14 |
| Glass | 327.0 | 99.0 | 67.1 | 18 | 50 | 34 | −17 |
| Glass | 297.0 | 84.0 | 67.1 | 24 | 56 | −35 | 25 |
| Glass | 297.0 | 89.0 | 67.1 | 25 | 57 | −24 | 21 |
| Glass | 297.0 | 94.0 | 67.1 | 24 | 57 | −12 | 15 |
| Glass | 297.0 | 104.0 | 67.1 | 23 | 55 | 9 | 3 |
| Glass | 297.0 | 109.0 | 67.1 | 21 | 53 | 19 | −3 |
| Glass | 297.0 | 114.0 | 67.1 | 20 | 51 | 26 | −7 |
| Glass | 297.0 | 119.0 | 67.1 | 18 | 49 | 32 | −11 |
| Glass | 297.0 | 99.0 | 32.1 | 12 | 41 | 7 | −11 |
| Glass | 297.0 | 99.0 | 42.1 | 16 | 46 | 16 | −15 |
| Glass | 297.0 | 99.0 | 47.1 | 17 | 48 | 20 | −17 |
| Glass | 297.0 | 99.0 | 52.1 | 22 | 54 | −18 | 11 |
| Glass | 297.0 | 99.0 | 57.1 | 23 | 55 | −12 | 10 |
| Glass | 297.0 | 99.0 | 62.1 | 24 | 56 | −6 | 9 |
| Glass | 297.0 | 99.0 | 72.1 | 24 | 56 | 4 | 9 |
| Glass | 297.0 | 99.0 | 77.1 | 23 | 55 | 8 | 11 |
| Glass | 297.0 | 99.0 | 82.1 | 22 | 54 | 12 | 14 |
| Glass | 297.0 | 99.0 | 87.1 | 20 | 52 | 16 | 18 |
| Glass | 297.0 | 99.0 | 92.1 | 13 | 42 | −12 | −1 |
| Glass | 297.0 | 99.0 | 97.1 | 11 | 40 | 36 | 8 |

TABLE 3

Substrate: glass; surrounding: polycarbonate

| Substrate | Thickness (nm) | | | Reflectance properties | | | |
|---|---|---|---|---|---|---|---|
| | Flake | SiO₂ | TiO₂ | R(%) | L* | a* | b* |
| BiOCl | 100 | 0 | 0 | 3 | 19 | −3 | 19 |
| BiOCl | 200 | 0 | 0 | 3 | 20 | −19 | 4 |
| BiOCl | 300 | 0 | 0 | 1 | 10 | 5 | −22 |
| Glass | 270.7 | 94.0 | 67.5 | 16 | 47 | −34 | 22 |
| Glass | 275.7 | 94.0 | 67.5 | 16 | 47 | −27 | 19 |
| Glass | 285.7 | 94.0 | 67.5 | 16 | 47 | −14 | 12 |
| Glass | 295.7 | 94.0 | 67.5 | 15 | 46 | 1 | 3 |
| Glass | 305.7 | 94.0 | 67.5 | 14 | 45 | 12 | −5 |
| Glass | 315.7 | 94.0 | 67.5 | 13 | 43 | 22 | −12 |
| Glass | 325.7 | 94.0 | 67.5 | 12 | 41 | 30 | −17 |
| Glass | 330.7 | 94.0 | 67.5 | 11 | 40 | 32 | −19 |
| Glass | 295.7 | 97.1 | 67.5 | 15 | 46 | −36 | 21 |
| Glass | 295.7 | 84.0 | 67.5 | 16 | 47 | −24 | 16 |
| Glass | 295.7 | 94.0 | 67.5 | 15 | 46 | −1 | 3 |
| Glass | 295.7 | 104.0 | 67.5 | 13 | 43 | 19 | −8 |
| Glass | 295.7 | 109.0 | 67.5 | 12 | 42 | 26 | −12 |
| Glass | 295.7 | 114.0 | 67.5 | 11 | 40 | 31 | −15 |
| Glass | 295.7 | 94.0 | 36.5 | 9 | 36 | −31 | 10 |
| Glass | 295.7 | 94.0 | 41.5 | 11 | 39 | −27 | 9 |
| Glass | 295.7 | 94.0 | 46.5 | 12 | 42 | −23 | 7 |
| Glass | 295.7 | 94.0 | 56.5 | 14 | 45 | −12 | 5 |
| Glass | 295.7 | 94.0 | 66.5 | 15 | 46 | −2 | 3 |
| Glass | 295.7 | 94.0 | 76.5 | 15 | 45 | 7 | 5 |
| Glass | 295.7 | 94.0 | 86.5 | 13 | 42 | 14 | 12 |
| Glass | 295.7 | 94.0 | 96.5 | 10 | 38 | 20 | 22 |
| Glass | 295.7 | 94.0 | 101.5 | 9 | 36 | 22 | 28 |
| Glass | 295.7 | 94.0 | 106.5 | 7 | 33 | 25 | 34 |

It can be confirmed from Tables 1 to 3 that, regardless of whether the surrounding is air or either of the transparent resins, the suitable thicknesses of the glass flake and layers are in the following ranges in order to obtain a reflected light having absolute values of a* and b* of 30 or less and that the L* value (about 68 or more) higher than ever before can be obtained in air by employing the following ranges.

Glass flake: 284 nm or more and 322 nm or less
Thickness of silicon oxide layer: 89 nm or more and 109 nm or less
Thickness of Titanium oxide layer: 51 nm or more and 86 nm or less

TABLE 4

Substrate: alumina; surrounding: air

| Substrate | Thickness (nm) | | | Reflectance properties | | | |
|---|---|---|---|---|---|---|---|
| | Flake | SiO₂ | TiO₂ | R(%) | L* | a* | b* |
| Alumina | 255.0 | 88.0 | 61.5 | 54 | 78 | −36 | 26 |
| Alumina | 260.0 | 88.0 | 61.5 | 54 | 79 | −27 | 21 |
| Alumina | 265.0 | 88.0 | 61.5 | 54 | 78 | −18 | 16 |
| Alumina | 270.0 | 88.0 | 61.5 | 53 | 78 | −9 | 10 |
| Alumina | 275.0 | 88.0 | 61.5 | 52 | 77 | 1 | 3 |
| Alumina | 280.0 | 88.0 | 61.5 | 51 | 76 | 8 | −2 |
| Alumina | 285.0 | 88.0 | 61.5 | 49 | 75 | 16 | −7 |
| Alumina | 295.0 | 88.0 | 61.5 | 44 | 72 | 30 | −17 |
| Alumina | 300.0 | 88.0 | 61.5 | 42 | 71 | 35 | −21 |
| Alumina | 275.0 | 73.0 | 61.5 | 50 | 76 | −34 | 18 |
| Alumina | 275.0 | 78.0 | 61.5 | 51 | 77 | −22 | 14 |
| Alumina | 275.0 | 83.0 | 61.5 | 52 | 77 | −11 | 9 |
| Alumina | 275.0 | 93.0 | 61.5 | 51 | 77 | 10 | −1 |
| Alumina | 275.0 | 98.0 | 61.5 | 50 | 76 | 18 | −5 |
| Alumina | 275.0 | 103.0 | 61.5 | 48 | 75 | 26 | −9 |
| Alumina | 275.0 | 108.0 | 61.5 | 45 | 73 | 32 | −11 |
| Alumina | 275.0 | 88.0 | 41.5 | 40 | 69 | −39 | 12 |
| Alumina | 275.0 | 88.0 | 46.5 | 45 | 73 | −29 | 11 |
| Alumina | 275.0 | 88.0 | 51.5 | 48 | 75 | −18 | 8 |
| Alumina | 275.0 | 88.0 | 56.5 | 51 | 77 | −9 | 6 |
| Alumina | 275.0 | 88.0 | 66.5 | 52 | 77 | 8 | 2 |

TABLE 4-continued

Substrate: alumina; surrounding: air

| Substrate | Thickness (nm) | | | Reflectance properties | | | |
|---|---|---|---|---|---|---|---|
| | Flake | SiO$_2$ | TiO$_2$ | R(%) | L* | a* | b* |
| Alumina | 275.0 | 88.0 | 71.5 | 52 | 77 | 15 | 1 |
| Alumina | 275.0 | 88.0 | 81.5 | 47 | 74 | 26 | 4 |
| Alumina | 275.0 | 88.0 | 86.5 | 44 | 72 | 30 | 8 |
| Alumina | 275.0 | 88.0 | 91.5 | 40 | 70 | 32 | 14 |

TABLE 5

Substrate: alumina; surrounding: PMMA

| Substrate | Thickness (nm) | | | Reflectance properties | | | |
|---|---|---|---|---|---|---|---|
| | Flake | SiO$_2$ | TiO$_2$ | R(%) | L* | a* | b* |
| Alumina | 250.0 | 94.0 | 64.0 | 35 | 66 | −24 | 33 |
| Alumina | 255.0 | 94.0 | 64.0 | 34 | 65 | −15 | 27 |
| Alumina | 260.0 | 94.0 | 64.0 | 33 | 64 | −6 | 19 |
| Alumina | 262.5 | 94.0 | 64.0 | 33 | 64 | −2 | −16 |
| Alumina | 265.0 | 94.0 | 64.0 | 32 | 63 | 3 | 12 |
| Alumina | 270.0 | 94.0 | 64.0 | 31 | 62 | 11 | 4 |
| Alumina | 275.0 | 94.0 | 64.0 | 29 | 61 | 20 | −3 |
| Alumina | 280.0 | 94.0 | 64.0 | 27 | 59 | 27 | −10 |
| Alumina | 285.0 | 94.0 | 64.0 | 25 | 57 | 34 | −16 |
| Alumina | 265.0 | 74.0 | 64.0 | 31 | 62 | −36 | 29 |
| Alumina | 265.0 | 79.0 | 64.0 | 32 | 63 | −26 | 27 |
| Alumina | 265.0 | 84.0 | 64.0 | 33 | 64 | −16 | 23 |
| Alumina | 265.0 | 89.0 | 64.0 | 33 | 64 | −7 | 17 |
| Alumina | 265.0 | 99.0 | 64.0 | 31 | 62 | 11 | 7 |
| Alumina | 265.0 | 104.0 | 64.0 | 29 | 61 | 19 | 2 |
| Alumina | 265.0 | 109.0 | 64.0 | 28 | 60 | 27 | −2 |
| Alumina | 265.0 | 114.0 | 64.0 | 26 | 58 | 32 | −5 |
| Alumina | 265.0 | 94.0 | 14.0 | 10 | 39 | −16 | 27 |
| Alumina | 265.0 | 94.0 | 19.0 | 13 | 43 | −21 | 25 |
| Alumina | 265.0 | 94.0 | 24.0 | 16 | 47 | −23 | 23 |
| Alumina | 265.0 | 94.0 | 39.0 | 24 | 57 | −19 | 19 |
| Alumina | 265.0 | 94.0 | 44.0 | 27 | 59 | −16 | 17 |
| Alumina | 265.0 | 94.0 | 49.0 | 29 | 61 | −11 | 15 |
| Alumina | 265.0 | 94.0 | 54.0 | 31 | 62 | −7 | 14 |
| Alumina | 265.0 | 94.0 | 74.0 | 31 | 63 | 11 | 13 |
| Alumina | 265.0 | 94.0 | 79.0 | 30 | 69 | 15 | 15 |
| Alumina | 265.0 | 94.0 | 84.0 | 29 | 61 | 18 | 19 |
| Alumina | 265.0 | 94.0 | 89.0 | 27 | 59 | 21 | 23 |
| Alumina | 265.0 | 94.0 | 94.0 | 25 | 57 | 23 | 29 |
| Alumina | 265.0 | 94.0 | 99.0 | 23 | 55 | 26 | 35 |

TABLE 6

Substrate: alumina; surrounding: polycarbonate

| Substrate | Thickness (nm) | | | Reflectance properties | | | |
|---|---|---|---|---|---|---|---|
| | Flake | SiO$_2$ | TiO$_2$ | R(%) | L* | a* | b* |
| Alumina | 248.1 | 87.2 | 62.3 | 25 | 57 | −32 | 31 |
| Alumina | 253.1 | 87.2 | 62.3 | 25 | 57 | −23 | 27 |
| Alumina | 258.1 | 87.2 | 62.3 | 24 | 56 | −15 | 21 |
| Alumina | 268.1 | 87.2 | 62.3 | 23 | 55 | 3 | 7 |
| Alumina | 278.1 | 87.2 | 62.3 | 20 | 52 | 19 | −7 |
| Alumina | 283.1 | 87.2 | 62.3 | 19 | 50 | 26 | −13 |
| Alumina | 288.1 | 87.2 | 62.3 | 17 | 49 | 33 | −19 |
| Alumina | 268.1 | 99.0 | 62.3 | 21 | 53 | −37 | 25 |
| Alumina | 268.1 | 72.2 | 62.3 | 22 | 54 | −27 | 22 |
| Alumina | 268.1 | 77.2 | 62.3 | 23 | 55 | −17 | 18 |
| Alumina | 268.1 | 87.2 | 62.3 | 23 | 55 | 3 | 7 |
| Alumina | 268.1 | 97.2 | 62.3 | 21 | 53 | 20 | −3 |
| Alumina | 268.1 | 102.2 | 62.3 | 19 | 51 | 97 | −7 |
| Alumina | 268.1 | 107.2 | 62.3 | 18 | 49 | 32 | −10 |
| Alumina | 268.1 | 87.2 | 32.3 | 14 | 44 | −19 | 16 |
| Alumina | 268.1 | 87.2 | 42.3 | 18 | 49 | −14 | 12 |
| Alumina | 268.1 | 87.2 | 52.3 | 21 | 53 | −6 | 9 |

TABLE 6-continued

Substrate: alumina; surrounding: polycarbonate

| Substrate | Thickness (nm) | | | Reflectance properties | | | |
|---|---|---|---|---|---|---|---|
| | Flake | SiO$_2$ | TiO$_2$ | R(%) | L* | a* | b* |
| Alumina | 268.1 | 87.2 | 62.3 | 23 | 55 | 3 | 7 |
| Alumina | 268.1 | 87.2 | 72.3 | 22 | 54 | 11 | 8 |
| Alumina | 268.1 | 87.2 | 82.3 | 21 | 53 | 17 | 13 |
| Alumina | 268.1 | 87.2 | 92.3 | 18 | 49 | 23 | 21 |
| Alumina | 268.1 | 87.2 | 97.3 | 16 | 47 | 25 | 27 |
| Alumina | 268.1 | 87.2 | 102.3 | 15 | 45 | 27 | 32 |

It can be confirmed from Tables 4 to 6 that, regardless of whether the surrounding is air or either of the transparent resins, the suitable thicknesses of the alumina flake and layers are in the following ranges in order to obtain a reflected light having absolute values of a* and b* of 30 or less and that a quite high L* value (about 72 or more) can be obtained in air by employing the following ranges.

Alumina flake: 260 nm or more and 280 nm or less
Silicon oxide layer: 79 nm or more and 102 nm or less
Titanium oxide layer: 47 nm or more and 87 nm or less Table 7 shows the results obtained by changing the thickness of the glass flake to 700 nm and the thickness of the silicon oxide layer to 70 nm and calculating in the same manner as above (refer to Examples 1 to 8 of Patent Literature 2). It can be understood that the L* value of reflected light is 67 or less and that the L* value is maximum when the thickness of the titanium oxide layer is 70 to 80 nm.

TABLE 7

Substrate: glass; surrounding: air

| Substrate | Thickness (nm) | | | Reflectance properties | | | |
|---|---|---|---|---|---|---|---|
| | Flake | SiO$_2$ | TiO$_2$ | R(%) | L* | a* | b* |
| Glass | 700 | 70 | 40 | 24 | 56 | −10 | −25 |
| Glass | 700 | 70 | 50 | 30 | 62 | −17 | −20 |
| Glass | 700 | 70 | 60 | 35 | 66 | −19 | −13 |
| Glass | 700 | 70 | 70 | 37 | 67 | −16 | −4 |
| Glass | 700 | 70 | 80 | 37 | 67 | −11 | 6 |
| Glass | 700 | 70 | 90 | 35 | 65 | −5 | 20 |
| Glass | 700 | 70 | 100 | 30 | 62 | 2 | 36 |
| Glass | 700 | 70 | 110 | 25 | 57 | 12 | 46 |

TABLE 8

Substrate: glass; surrounding: air

| Substrate | Thickness (nm) | | | Reflectance properties | | | |
|---|---|---|---|---|---|---|---|
| | Flake | SiO$_2$ | TiO$_2$ | R(%) | L* | a* | b* |
| Glass | 300 | 70 | 10 | 5 | 29 | 10 | −0 |
| Glass | 300 | 70 | 20 | 7 | 32 | 47 | −43 |
| Glass | 300 | 70 | 30 | 10 | 38 | 34 | −49 |
| Glass | 300 | 70 | 40 | 17 | 48 | −11 | −34 |
| Glass | 300 | 70 | 50 | 26 | 58 | −53 | −11 |
| Glass | 300 | 70 | 60 | 35 | 66 | −69 | 11 |
| Glass | 300 | 70 | 70 | 42 | 71 | −62 | 25 |
| Glass | 300 | 70 | 80 | 45 | 73 | −43 | 31 |
| Glass | 300 | 70 | 90 | 44 | 72 | −23 | 35 |
| Glass | 300 | 70 | 100 | 39 | 68 | −4 | 43 |
| Glass | 300 | 70 | 110 | 30 | 62 | 16 | 49 |
| Glass | 300 | 70 | 120 | 21 | 53 | 37 | 30 |
| Glass | 300 | 70 | 130 | 13 | 43 | 56 | −10 |
| Glass | 300 | 70 | 140 | 8 | 35 | 63 | −42 |
| Glass | 300 | 70 | 150 | 7 | 32 | 48 | −56 |

TABLE 8-continued

Substrate: glass; surrounding: air

| Substrate | Thickness (nm) | | | Reflectance properties | | | |
|---|---|---|---|---|---|---|---|
| | Flake | SiO$_2$ | TiO$_2$ | R(%) | L* | a* | b* |
| Glass | 300 | 70 | 160 | 8 | 35 | 15 | −52 |
| Glass | 300 | 70 | 170 | 12 | 42 | −17 | −37 |
| Glass | 300 | 70 | 180 | 15 | 46 | −28 | −28 |
| Glass | 300 | 70 | 190 | 24 | 56 | −55 | 0 |
| Glass | 300 | 70 | 200 | 30 | 61 | −64 | 17 |

As shown in Table 8, when the preferable combination of the thicknesses (70 nm and 70 to 80 nm; refer to Table 7) of the silicon oxide layer and titanium oxide layer is employed for a thin glass flake, the L* value is increased but whitish reflected light cannot be produced. Additionally, for the combination of the thicknesses (titanium oxide layer: 10 nm or 180 nm) with which a reflected light having absolute values of a* and b* of 30 or less is produced, the L* value is greatly decreased. When the layer thicknesses suitable for the use with a thick flaky substrate are employed for a thin flaky substrate, high brightness is achieved for colored reflected light but not for whitish reflected light. As can be understood from Patent Literature 2, conventionally, the thicknesses of the silicon oxide layer and titanium oxide layer are often adjusted by a method in which the titanium oxide layer on the silicon oxide layer having a predetermined thickness is increased in thickness (Table 8) while reflected light is kept under observation. Although this method is capable of adjusting the thickness of the titanium oxide layer appropriately in relation to the thickness of a layer other than the titanium oxide layer, it is difficult to adjust the thickness of each of the layers including the other layer so that the layers will have mutually appropriate thicknesses.

The properties of a reflected light from one piece of a pigment are calculated in every case of the above optical simulation. However, reflected light from, for example, an actual paint film, where there are a plurality of pieces of a pigment in the transmission direction of light, is observed to have higher brightness than the brightness determined by the optical simulation. This is reproduced by the optical simulation, for example, as follows.

TABLE 9

Substrate: glass; surrounding: PMMA

| Substrate | | Thickness (nm) | | | Reflectance properties | | | |
|---|---|---|---|---|---|---|---|---|
| Type | Number of overlapping pigments | Flake | SiO$_2$ | TiO$_2$ | R(%) | L* | a* | b* |
| Glass | 1 | 700 | 70 | 80 | 18 | 49 | −9 | 0 |
| Glass | 2 | 700 | 70 | 80 | 28 | 60 | −10 | 1 |
| Glass | 3 | 700 | 70 | 80 | 36 | 66 | −10 | 1 |
| Glass | 4 | 700 | 70 | 80 | 41 | 70 | −11 | 1 |
| Glass | 5 | 700 | 70 | 80 | 45 | 73 | −11 | 1 |
| Glass | 6 | 700 | 70 | 80 | 49 | 75 | −11 | 1 |

In a paint film, it is common to observe reflected light from three to six pieces of a pigment. The L* values obtained by the optical simulation are approximately equal to the L* value (76) of the reflected light measured in Examples 1 and 2 of Patent Literature 2.

The invention claimed is:

1. A glitter pigment, comprising:
a flaky substrate; and
a silicon oxide layer and a titanium oxide layer formed in this order on the flaky substrate, wherein
the silicon oxide layer and the titanium oxide layer are formed on both a first principal surface and a second principal surface of the flaky substrate, the first principal surface and the second principal surface being opposite to each other,
the titanium oxide layer, the silicon oxide layer, the flaky substrate, the silicon oxide layer, and the titanium oxide layer which are arranged in this order along a thickness direction of the flaky substrate compose a five-layer optical interference system producing whitish reflected light,
the flaky substrate is a glass flake,
the glass flake has a thickness of 294 nm or more and 314 nm or less,
the silicon oxide layer has a thickness of 92 nm or more and 102 nm or less,
the titanium oxide layer has a thickness of 55.9 nm or more and 76 nm or less, and the glitter pigment surrounded by air produces reflected light having absolute values of a* and b* that are each 20 or less and an L* value that is 72 or more as calculated by an optical simulation.

2. The glitter pigment according to claim 1, wherein the titanium oxide layer has a thickness of 56 nm or more and 76 nm or less.

3. The glitter pigment according to claim 1, wherein the glass flake has a thickness of 294 nm or more and 306 nm or less,
the silicon oxide layer has a thickness of 94 nm or more and 102 nm or less, and
the titanium oxide layer has a thickness of 56.5 nm or more and 76 nm or less.

4. A pigment-containing composition comprising the glitter pigment according to claim 1.

5. The pigment-containing composition according to claim 4, comprising polymethylmethacrylate (PMMA) and/or polycarbonate in addition to the glitter pigment.

6. A pigment-containing painted product, comprising:
a substrate material; and
a paint film formed on the substrate material, the paint film containing the glitter pigment according to claim 1.

7. The glitter pigment according to claim 1, wherein the glitter pigment consists of the silicon oxide layer and the titanium oxide layer formed on the first and second principal surfaces of the flaky substrate.

* * * * *